United States Patent [19]

Morris

[11] Patent Number: 4,657,429

[45] Date of Patent: Apr. 14, 1987

[54] SECURING MEANS

[75] Inventor: Norman Morris, Buckingham, England

[73] Assignee: Leslie Hattridge Limited, Buckingham, England

[21] Appl. No.: 823,815

[22] Filed: Jan. 28, 1986

[30] Foreign Application Priority Data

Feb. 5, 1985 [GB] United Kingdom ............... 8502873

[51] Int. Cl.⁴ .......................... B25G 3/28; F16D 1/00
[52] U.S. Cl. ..................................... 403/362; 403/354
[58] Field of Search ................. 403/362, 354; 411/291

[56] References Cited

U.S. PATENT DOCUMENTS

| | | | |
|---|---|---|---|
| 2,118,878 | 5/1938 | Bowman | 411/291 X |
| 2,472,421 | 6/1949 | Hamill et al. | 411/291 X |
| 3,338,602 | 8/1967 | Arnd | 403/362 X |
| 3,460,847 | 8/1969 | Hohwart et al. | 403/362 X |
| 4,586,845 | 5/1986 | Morris | 403/354 |

Primary Examiner—Andrew V. Kundrat
Attorney, Agent, or Firm—Berman, Aisenberg & Platt

[57] ABSTRACT

Securing means for use in a drive coupling between rotary drive means and a tang-ended shaft of the pump of a fuel injection system, the securing means comprising a block which has (a) a hole or recess in it which provides mutually inwardly facing surfaces for engaging the opposite sides of such a tang end, or two parts of an adaptor between which such a tang end is held, (b) two laterally displaced screwthreaded bores extending from opposite outer sides of the block to the hole or recess, opening out respectively on the said mutually inwardly facing surfaces, (c) two slots each of which extends, in a plane which is transverse in relation to the respective screwthreaded bore, from a side of the block, at which the slot is open, across the screwthreaded bore and beyond it, to a closed end of the slot, stresses in the material of the block tending to shift material of the block on one side of the slot relative to the material of the block on the other side of the slot, and (d) two fixing screws which extend respectively through the two screwthreaded bores on both sides of the respective slot so that rotation of the screws is resisted by the material of the block.

2 Claims, 6 Drawing Figures

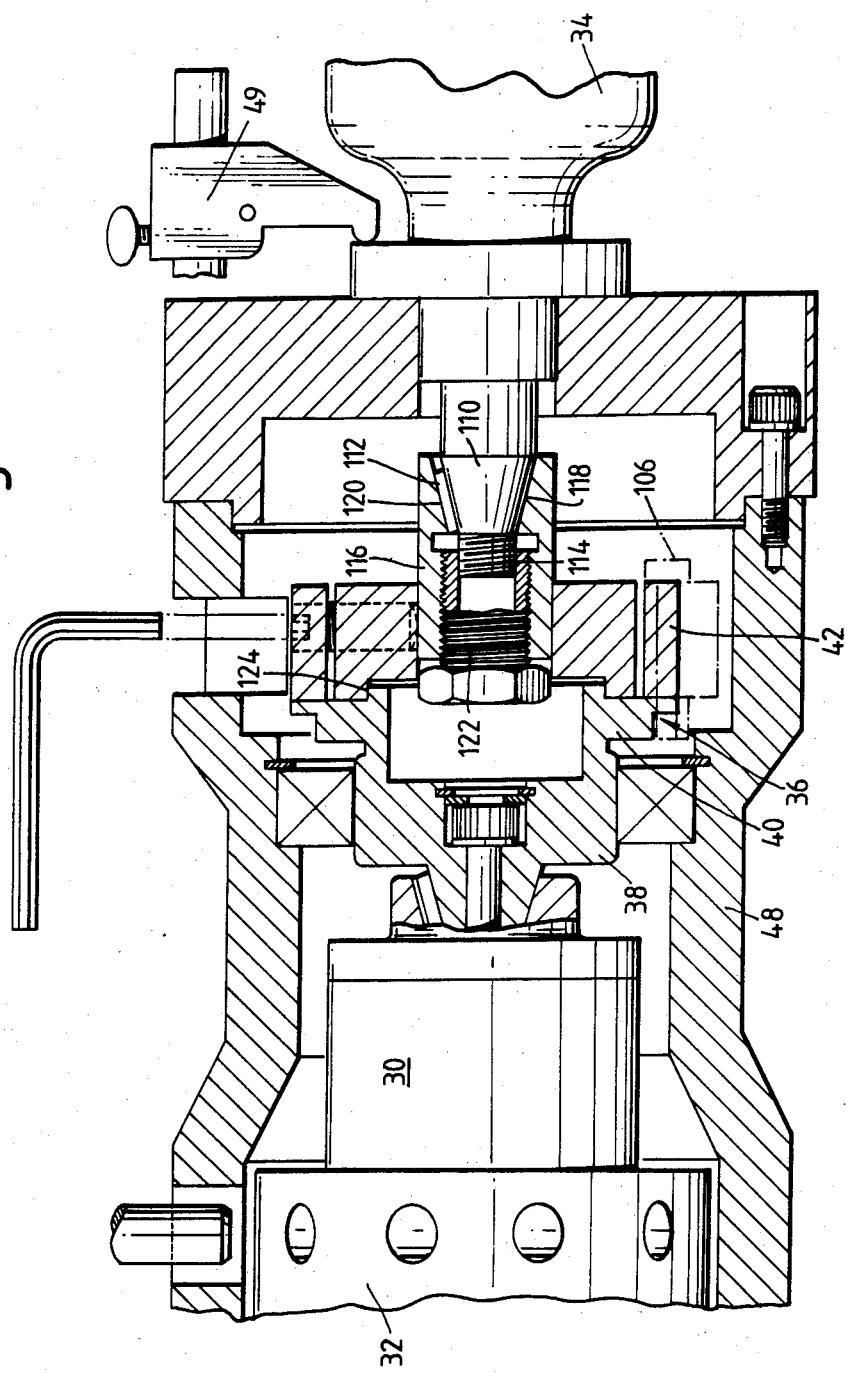

SECURING MEANS

The present invention relates to securing means, especially but not exclusively for use in connecting a drive coupling to a non-splined end of a pump shaft or other pump drive member, for example in connecting an electric drive motor or other prime mover to a tang-ended or spigot-ended shaft of a fuel or test oil pump arranged in fuel injection test equipment, via an anti-backlash coupling. To enable the securing means to be connected to a frusto-conical ended pump shaft, an adaptor may be used to convert the frusto-conical end to a tang end.

In our co-pending U.S. patent application Ser. No. 06/696,577 filed on Jan. 29th, 1985, and now U.S. Pat. No. 4,586,845 we describe a connection between a tang-ended or spigot-ended pump shaft and a drive coupling.

One disadvantage of such a connection is the complex construction of one of the drive components. The latter has fixing pins, each of which has one end pressed against an adaptor of the coupling by means of a cam surface on the inside of an outer ring of the component acting on the other end of the fixing pin. Rotation of the outer ring effects tightening or loosening of the fixing pin. Spring-biased friction members hold the outer ring in place in the tightened condition.

A further disadvantage of such a drive component is that, for certain heavy duty or high speed applications, the fixing pins can loosen.

One aim of the present invention is to provide a drive component which is less subject to one or more of the foregoing disadvantages.

Accordingly, the present invention is directed to securing means comprising a block of solid material through which extends a screwthreaded bore, and a slot which extends, in a plane which is transverse in relation to the bore, from one side of the block, at which the slot is open, across the bore and beyond it to a closed end of the slot, stresses in the material of the block tending to shift material of the block on one side of the slot relative to the material of the block on the other side of the slot, so that rotation of a screw, which when the securing means are in use extends through the bore on both sides of the slot, is resisted by the material of the block.

Preferably, the closed end of the slot is defined by a bore having a cross-sectional diameter which is greater than the width of the slot, the width of the slot in this sense being the shortest distance between the material on one side of the slot and the material on the other side of the slot.

During the manufacture of such securing means, if the screwthreaded bore is formed in the block first, then the bore for the slot transversely of the screwthreaded bore, then the slot across the screwthreaded bore up to the bore for the slot, the stresses created in the block will tend to cause a relative shifting between the material on one side of the slot and that on the other.

A preferred material for the block is steel.

One form of the present invention is a block for use in a drive coupling between rotary drive means and a tang-ended shaft of the pump of a fuel injection system. Such a block has (a) a hole or recess in it which provides mutually inwardly facing surfaces for engaging the opposite sides of such a tang end, or two parts of an adaptor between which such a tang end is held, (b) two laterally displaced screw-threaded bores extending from opposite outer sides of the block to the hole or recess, opening out respectively on the said mutually inwardly facing surfaces, (c) two slots each of which extends, in a plane which is transverse in relation to the respective screwthreaded bore, from a side of the block, at which the slot is open, across the screwthreaded bore and beyond it, to a closed end of the slot, stresses in the material of the block tending to shift material of the block on one side of the slot relative to the material of the block on the other side of the slot, and (d) two fixing screws which extend respectively through the two screwthreaded bores on both sides of the respective slot so that rotation of the screws is resisted by the material of the block. When such a block is in use, the inner ends of the fixing screws press against such a tang end or such an adaptor to inhibit backlash.

Examples of securing means each in accordance with the present invention are illustrated in the accompanying diagrammatic drawings, in which:

FIG. 5 is an axial sectional view of a drive connecting assembly which incorporates a further modified form of securing means.

Figure 1:
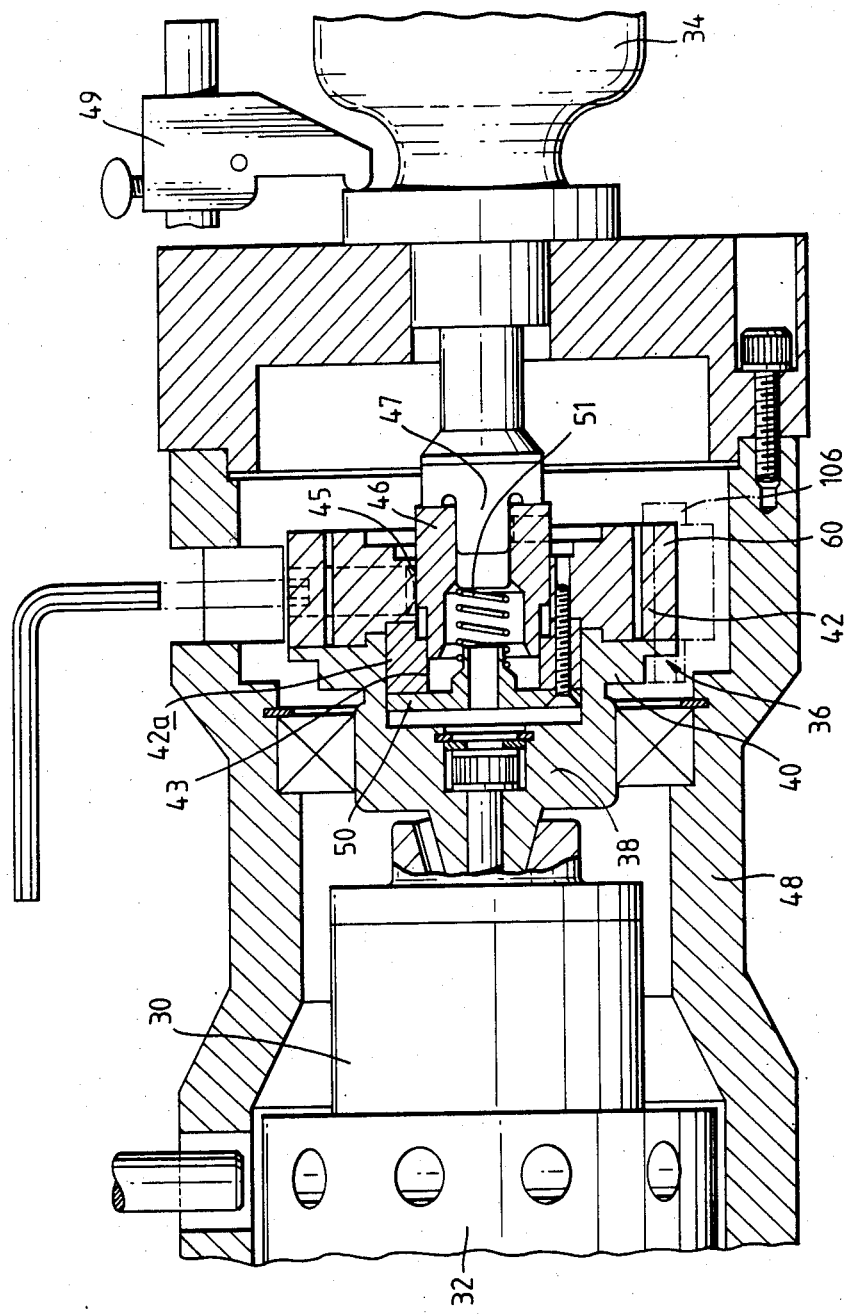
FIG. 1 is an axial sectional view of a drive connecting assembly which incorporates such securing means.
Figure 2:
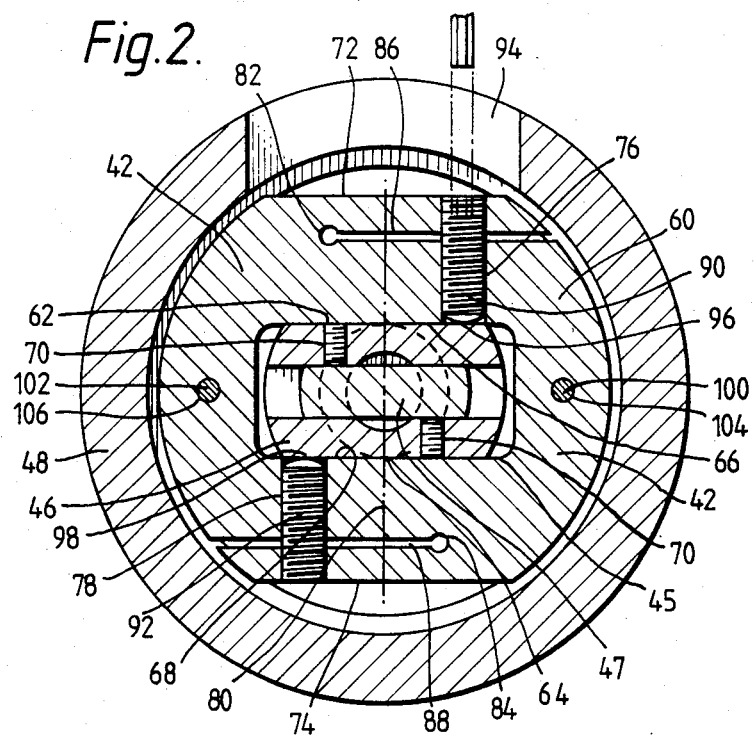
FIG. 2 is a cross-sectional view of the securing means.

In FIGS. 1 and 2, the output side 30 of an anti-backlash coupling 32 is connected to a pump 34 via an anti-backlash drive 36. The latter comprises an attachment cup 38 secured to the output side 30 of the coupling 32 and is provided with a flange 40 to which an anti-backlash drive component 42 is fixed by bolts 44. The anti-backlash drive component 42 is in the form of a generally circular block with an elongate hole or recess 45 for engagement with an adaptor 46 attached to a tang 47 at the end of the shaft of a pump 34. The component 42 also has a part 42a bolted to it which provides a central circularly cross-sectioned hole or recess 43 behind the elongate hole or recess 45. Also shown in FIG. 1 are a drive housing 48 and a clamp 49 which holds the pump 34 against axial displacement from the drive 42.

A location plate 50 provides a seating for one end of a compression spring 51. The spring 51 extends through the adaptor, which is hollow for this purpose, and its other end applies a force to the tang 47 to urge the pump shaft inwardly in relation to the pump to keep the correct relative positioning of the shaft in the pump.

The drive component 42 comprises a generally circular block 60 with the elongate hole or recess 45 at its centre. Two oppositely mutually inwardly directed faces 62 and 64 of the hole or recess 45 are in contact with the corresponding outwardly directed faces 66 and 68 of a bifurcated end of the adaptor 46, the tang end 47 of the pump shaft being held between the two ends of the bifurcation by fixing screws 70 which inhibit backlash between the adaptor 46 and the tang end 47.

The block 60 is provided with flats 72 and 74 on its periphery, these being parallel to the inwardly directed faces 62 and 64 of the hole or recess 45. Two screwthreaded bores 76 and 78, which are parallel to one another but offset from one another to opposite sides of the median plane 80 through the block 60. Thus the screwthreaded bores are substantially at right angles to the faces 62 and 64 and the flats 72 and 74, each screwthreaded bore extending from one the flats to the nearer of the faces 62 and 64. Two bores 82 and 84 are formed through the block, each being orthogonal to the screwthreaded bores 76 and 78 and the elongate hole or recess 45, and positioned a little inwardly from the flats 72 and 74 respectively.

Pinch slots 86 and 88 are cut into the block inwardly from opposite sides thereof, parallel to the flats 72 and 74 and inwardly therefrom by the same amount as the bores 82 and 84, all the way to those bores so that they pass through the screwthreaded bores 76 and 78. The slots therefore extend in respective planes which lie transversely of the screwthreaded bores 76 and 78 from sides of the block 60, where they are open, across those bores and beyond them to the bores 82 and 84 which define closed ends of the slots. The diameter of the cross section of the bores 82 and 84 is greater than the width of the slots 86 and 88, width being defined here as the shortest distance between material on one side of the slot and the material on the other side of the slot.

The block 60 may, by way of example only, have a diameter of about 76 millimeters, with a slot width of about 1 millimeter, and the diameter of the bores 82 and 84 for the slots (the ones defining the closed or blind ends of the slots) being about 4 millimeters.

The formation of the block 60 in this way, and with the various voids formed in this order, results in stresses within the material of the block which urge the material of the block on one side of each slot towards the material on the other side of the slot. This results in the two halves of each screwthreaded bore having their pitches out of position relative to one another. Consequently, when fixing allen screws 90 and 92 are screwed into the screwthreaded bores 76 and 78 by means of an allen key inserted through an access aperture 94 in the housing 48, the material of the block 60 resists their rotation so that they are held very firmly in position. The screws are turned fully home to bring their inside ends 96 and 98 against opposite outwardly directed faces of the adaptor 46. This prevents backlash between the drive component 42 and the adaptor 46. The allen screws will not loosen with use of the drive because of the stresses within the block 60.

Further fixing holes 100 and 102 are formed in the block 60 so that the latter can be secured to the flange 40 of the cup 38 by means of bolts 104 and 106.

The block 60 is symmetrical about a median plane which is parallel to its main faces, so that it can be removed from the flange 40, have the part 42a attached to its other side, turned back to front and re-attached to the flange 40. It is now fixed in a position appropriate for inhibiting backlash when the sense of the rotary drive is reversed.

Figure 4:
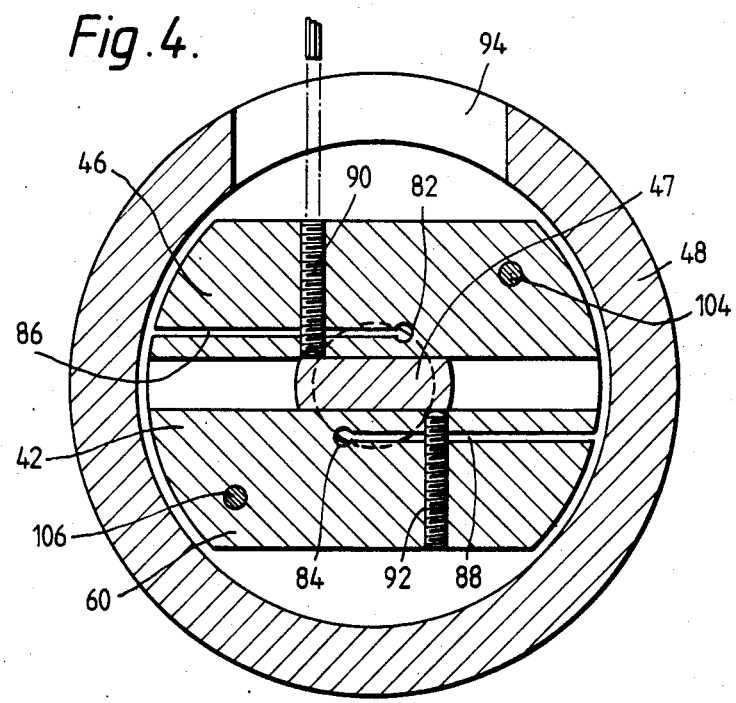
FIG. 4 is a cross-sectional view of the securing means shown in FIG. 3.
Figure 3:
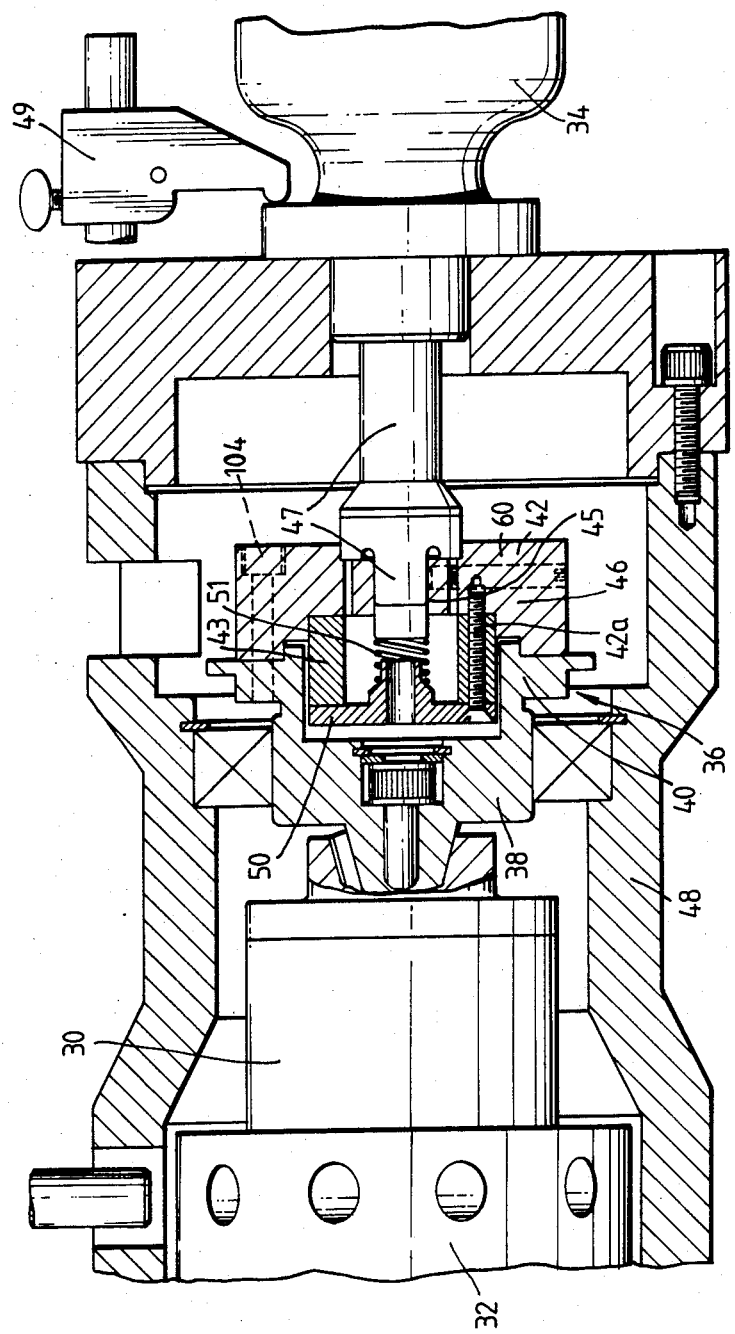
FIG. 3 is an axial sectional view of a drive connecting assembly which incorporates a modified form of securing means.

In the modification illustrated in FIGS. 3 and 4, the elongate hole or recess 45 is made much smaller for engagement of the drive component 42 directly on the tang end 47. The pinch slots 86 and 88 are much closer to the hole or recess 45 than they are to the flats 72 and 74, and the fixing holes 100 and 102 are repositioned accordingly.

Figure 6:
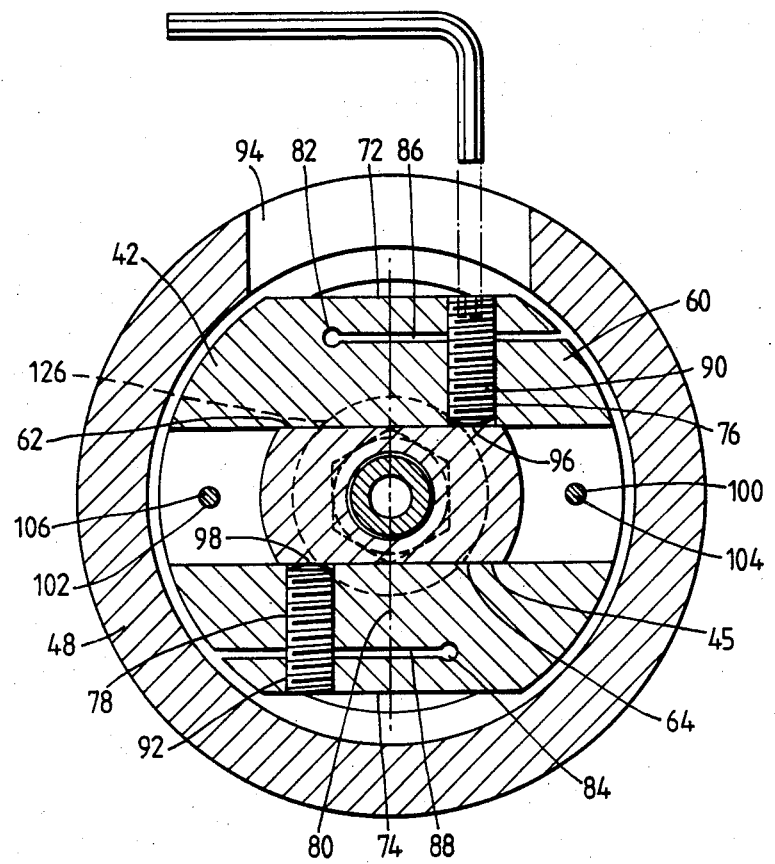
FIG. 6 is a cross-sectional view of the securing means shown in FIG. 5.

In the modification illustrated in FIGS. 5 and 6, the end of the shaft of the pump 34 is of a type to which a removable splined drive (not shown) is fitted when the pump is in normal use. In FIG. 5, the splined drive has been removed, leaving only a frusto-conical end 110 from which projects a key 112 in a radial direction and an externally screwthreaded spigot 114 in an axial direction. A tang-shaped adapter 116 has a frusto-conical recess 118 at one end to mate with the frusto-conical shaft end 110, and a slot 120 in that end of the adaptor engaging the key 112 of the shaft end to fix the mating members against relative rotation. The two members are fixed against axial displacement by means of a nut 122 having an internal screwthread which engages the externally screwthreaded spigot 114. Thus the adaptor 116 turns the shaft end into a tang end which can be held by the drive component 42. The latter may be formed with a circular hole or recess 124 on one side to centre it in relation to the attachment cup 38, and a circular hole or recess 126 on its other side to centre it in relation to the adaptor 116.

It will be appreciated that the securing means, comprising a block, a screwthreaded bore and a pinch slot, have applications other than in a drive coupling, and may be applied in any situation where a fixing screw is to be screwed into a block and held fast without a locking nut.

Although the manufacture of such securing means has been described in which desired stresses are naturally created by the manner in which the block is bored and cut, it will be appreciated that the material on opposite sides of the slot may be forced together or apart a little by means of a press or other device should the stresses automatically resulting be insufficient for the fixing of the screw.

I claim:

1. For use in a drive coupling between rotary drive means and a tang-ended shaft of the pump of a fuel injection system, securing means comprising:
   (a) a block of solid material;
   (b) wall means of said block defining a hole in said block;
   (c) mutually inwardly facing surfaces of said wall means which engage the opposite sides of such a tang end when the securing means is in use;
   (d) wall means of said block defining two laterally displaced screwthreaded bores extending from opposite outer sides of said block to said hole or recess, opening out respectively on said mutually inwardly facing surfaces;
   (e) wall means of said block defining two slots each of which extends, in a plane which is transverse in relation to the respective screwthreaded bore, from a side of said block, at which the slot is open, across the screwthreaded bore and beyond it, to a closed end of the slot, so that stresses in the material of said block tend to shift material of said block on one side of the slot relative to the material of said block on the other side of the slot, and
   (f) two fixing screws which extend respectively through said two screwthreaded bores on both sides of the respective slot so that rotation of the screws is resisted by the material of said block, wherein the closed end of each slot is defined by a bore having a cross-sectional diameter which is greater than the width of the slot, the width of the slot in this sense being the shortest distance between the material on one side of the slot and the material on the other side of the slot, and wherein the two slots are open on opposite sides of said block, and extend to their closed ends in respective opposite directions.

2. Securing means according to claim 1, wherein said block is provided with a circular recess on at least one of its sides for centring the securing means in relation to a part to which it is connected.

* * * * *